W. W. JOHNSTON.
HORSE-POWER.

No. 176,536 — Patented April 25, 1876.

UNITED STATES PATENT OFFICE.

WILLIAM WALLACE JOHNSTON, OF SUMMITVILLE, OHIO.

IMPROVEMENT IN HORSE-POWERS.

Specification forming part of Letters Patent No. 176,536, dated April 25, 1876; application filed March 25, 1876.

*To all whom it may concern:*

Be it known that I, WM. W. JOHNSTON, of Summitville, in the county of Columbiana and State of Ohio, have invented certain new and useful Improvements in Horse-Powers; and I do hereby declare that the following is a full, clear and exact description thereof, which will enable others skilled in the art to which it pertains to make and use the same, reference being had to the accompanying drawing, and to the letters of reference marked thereon, which form a part of this specification, and in which—

Figure 1:
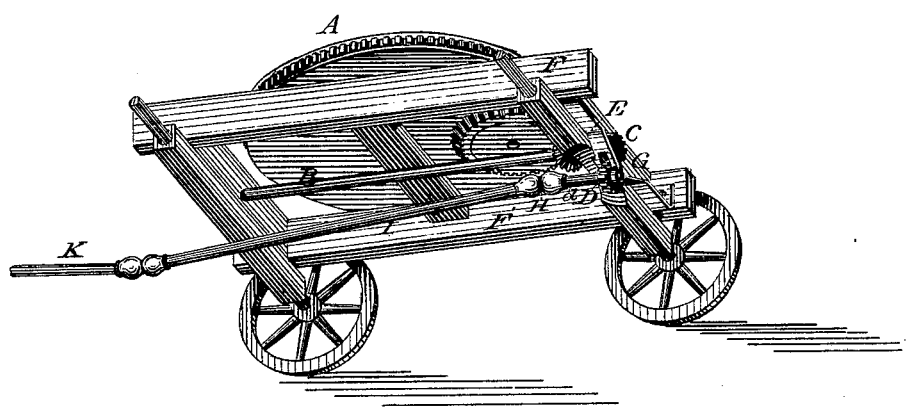
Figure 2:
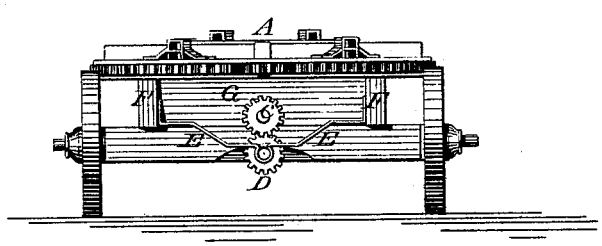

Figure 1 is a perspective view of an ordinary mounted horse-power having my improvement; and Fig. 2 is an end view of the same.

Similar letters of reference indicate corresponding parts.

This invention has for its object to obviate the danger which is the chief objection to most horse-powers now in use, viz: That of the horses breaking down in passing the shafts or rods that connect the power with the machine to which it is applied, owing to their elevation from the ground or track, which is generally such as to make it impossible for the horses to pull while passing them; and it consists in the construction and arrangement of parts, substantially as hereinafter set forth.

In the drawing, A is an ordinary mounted horse-power. To the end of the shaft B, where the tumbling-rods are usually coupled onto the power, is attached a pinion, C. A shaft, $d$, having a pinion, D, that engages with pinion C on shaft B, has its bearings in suitable boxing E, which is placed between the timbers F F and under the cross-piece G, which form part of the main frame of the horse-power A. The pinions C and D are, preferably, made of the same size, so that, when the power is set in motion, the shafts B and $d$ will have the same velocity; but this is not necessary, as, in order to regulate the speed of the machine, it may sometimes be desirable to use pinions of different size.

The shaft $d$ has a coupling, H, by which it is united to the tumbling-rod I. This consists of an ordinary iron rod of about the same length as the wagon upon which the power is mounted, and under which it is carried, in a downward slanting direction, until it nearly reaches the ground. It is then coupled in the usual manner to the next shaft or rod K, which may thus be allowed to lie on or very close to the ground.

This rod K being the one which the horses have to pass and step over, the advantage of my improvement will be readily perceived. In horse-powers, as now generally used, the first tumbling-rod is simply coupled to the shaft B, and from thence carried outward and downward to the place where it is coupled to the next rod. This makes it necessary for the horse nearest to the power to step over this slanting rod on every circuit, thereby endangering the horse, besides making it impossible for him to pull while passing the rod, thus making the working of the machine uneven and jolting, but where my improvement is used all this is obviated, the horses having to pass only the rod K, which lies flat on and close to the ground. It also frequently happens that the rods, when placed in the old-fashioned manner, break down, thereby endangering and often mutilating the horses, while, where my improvement is employed, the danger of such accident is comparatively slight.

Having thus described my invention, I claim and desire to secure by Letters Patent of the United States—

1. In a horse-power, the combination of the shaft B, with the pinion C, shaft $d$, and pinion D, substantially as and for the purpose hereinbefore set forth.

2. The combination, in a horse power, of the shafts B $d$, pinions C D, and rod or shaft I, substantially as and for the purpose hereinbefore set forth.

In testimony that I claim the foregoing as my own I have hereunto affixed my signature in presence of two witnesses.

WILLIAM WALLACE JOHNSTON.

Witnesses:
JOHN WEAVER,
A. G. MAPLE.